Figure 1:
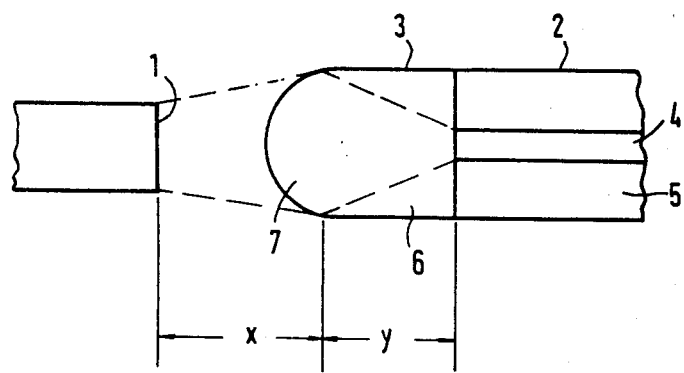

United States Patent [19]

Blüdaü

[11] 4,456,330
[45] Jun. 26, 1984

[54] OPTICAL COUPLING SYSTEM AND METHOD FOR MANUFACTURING SAME

[75] Inventor: Wolfgang Blüdaü, Gerlingen, Fed. Rep. of Germany

[73] Assignee: International Standard Electric Corporation, New York, N.Y.

[21] Appl. No.: 339,925

[22] Filed: Jan. 18, 1982

[30] Foreign Application Priority Data

Jan. 17, 1981 [DE] Fed. Rep. of Germany ....... 3101378

[51] Int. Cl.³ ............................................. G02B 5/172
[52] U.S. Cl. ................................. 350/96.18; 350/96.20
[58] Field of Search ............................ 350/96.18, 96.20; 250/227

[56] References Cited

U.S. PATENT DOCUMENTS

| 3,864,019 | 2/1975 | Smolinsky et al. | 350/96.17 |
| 4,102,559 | 7/1978 | Hunzinger | 350/96.18 |
| 4,143,940 | 3/1979 | Khoe | 350/96.15 |
| 4,147,402 | 4/1979 | Chown | 350/96.18 |
| 4,191,447 | 3/1980 | Borsuk | 350/96.20 |
| 4,204,743 | 5/1980 | Etaix | 350/96.20 |
| 4,281,891 | 8/1981 | Shinohara et al. | 350/96.18 |
| 4,327,963 | 5/1982 | Khoe et al. | 350/96.18 |
| 4,398,790 | 8/1983 | Righini et al. | 350/96.18 |

FOREIGN PATENT DOCUMENTS

| 2358881 | 6/1975 | Fed. Rep. of Germany . | |
| 56-62211 | 5/1981 | Japan | 350/96.20 |
| 2077943 | 12/1981 | United Kingdom | 350/96.18 |

OTHER PUBLICATIONS

Kato, Journal of Applied Physics, vol. 44, No. 6, Jun. 1973, "Light Coupling From a Stripe-Geometry, GaAs Diode Laser . . . ", pp. 2756-2758.

Peak et al., Applied Optics, vol. 14, No. 2, Feb. 1975, "Formation of a Spherical Lens at Optical Fiber Ends with a $CO_2$ Laser", pp. 294-298.

Cohen et al., Applied Optics, vol. 13, No. 1, Jan. 1974, "Microlenses for Coupling Junction Lasers to Optical Fibers", pp. 89-94.

Dakss, Laser Focus, Dec. 1975, "Coupling Light Sources to Fibers", pp. 31-34.

Primary Examiner—John D. Lee
Assistant Examiner—Frank González
Attorney, Agent, or Firm—John T. O'Halloran; Robert P. Seitter

[57] ABSTRACT

An optical coupling system (3) for coupling an optical fiber (2) to a laser is provided which consists of a homogeneous glass rod (3), e.g. a piece of a stripped plastic clad silica fiber. This piece is welded to the fiber and cut to a definite length $(y+\frac{2}{3}r)$. The free end (7) is rounded by heat treatment. The length ranging from $(y+\frac{2}{3}r)$ to $(y+r)$ of the optical coupling system is greater than the fiber diameter.

6 Claims, 2 Drawing Figures

OPTICAL COUPLING SYSTEM AND METHOD FOR MANUFACTURING SAME

The invention relates to an optical coupling system, and to a process of manufacturing same.

DESCRIPTION OF THE PRIOR ART

Optical coupling systems of this kind are disclosed in DE-OS No. 23 58 881 and in Appl. Optics Vol. 13 No. 1, January 1974, pages 89–94 (L. G. Cohen and M. V. Schneider). They are manufactured in several steps. In one example of embodiment of DE-OS No. 23 58 881 it is proposed to deposit on to the face side of the optical waveguide a coating consisting of a material other than that of the optical waveguide itself. On to this coating there is deposited a layer of photoresist. Following the exposure of this photoresist layer through a mask, the nonexposed areas are removed in the course of a further processing step. Thereafter, and within the area of the coupling surface, the optical waveguide is subjected to an etching solution. Following the etching and the removal of the remaining photoresist layer there is obtained a coarsely shaped lens (optical coupling system).

The last step of this process consists of a heat treatment of the coarsely shaped lens. During this heat treatment, light is coupled into the other end of the waveguide in such a way that the fundamental mode is excited. The heat treatment then depends on the intensity distribution of the light as emitting from the lens.

Generally it applies that for matching a semiconductor laser to a monomode optical waveguide, two requirements must be met. First the matching of the area of the emitting laser spot to the core cross sectional area of the waveguide and, secondly, the matching of the aperture of the light to be coupled in, to the aperture of the optical waveguide. Therefore, it is only possible to achieve an optimal matching when two independent setting quantities are freely variable.

In the case of the optical coupling systems as known from the above references, the distance between the laser and the lens and the radius of curvature of the lens are the two freely variable setting quantities. The lens itself is connected directly to the waveguide. The conventional process is technically sophisticated. Since, owing to the surface tension, the surface of the lens which, on account of the heat treatment, is temporarily liquid, cannot be formed into any arbitrary radii of curvature, only limited-accuracy is achievable. This results in a non-maximum coupling efficiency.

DESCRIPTION

Figure 2:
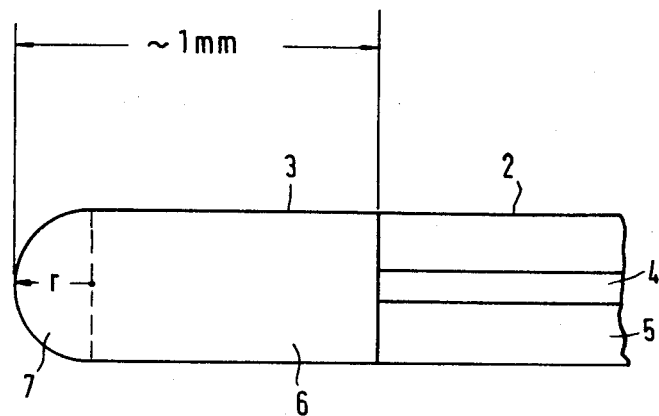

The invention will now be explained in greater detail with reference to an example of embodiment shown in FIGS. 1 and 2 of the accompanying drawings, in which:

FIG. 1 is a schematical representation of the coupling of a laser to an optical waveguide according to the invention, and FIG. 2 shows an optical waveguide provided with an optical coupling system.

In FIG. 1 at a certain distance ahead of the light-emitting surface 1 of a laser there is shown one end of a fiber-optic waveguide 2 with an optical coupling system 3.

The fiber-optic waveguide 2 is shown in a sectional elevation permitting to recognize the core 4 thereof and the cladding 5 surrounding the core 4. The normally provided protective coating is not shown. The end of the waveguide 2 is plane, and just as plane is the system 3 at the end facing the waveguide 2.

The optical coupling system 3 consists of a cylindrical part 6 of length y and of a hemispherical part 7 of length r. The distance between the light-emitting surface 1 and the cylindrical part 6 of the optical system 3 is indicated by the letter x. The light as emitted by the laser and coupled into the core 4 of the waveguide 2 through the optical coupling system 3 is indicated by its boundary rays.

The optical coupling system 3 is intended to focus the laser beam to the core 4 of the waveguide 2. To obtain optimal coupling efficiency for a given radius r, the values x and y should be calculated using the ray tracing method as described in Chapter 1.9 of the book by G. K. Grau, "Quantenelektroik" Vieweg-Verlag, Braunschweig 1978. The formulas for x and y according to the invention are $$x \approx \frac{r}{n-1}\left(1 + \frac{W_l}{W_f}\right) + r$$

$$y \approx \frac{r}{n-1}\left(1 + n\frac{W_f}{W_l}\right)$$

with
r: radius of the hemispherical part and fiber respectively
n: index of refraction of glass rod 3.
$W_{e,f}$ is calculated from $$\tan \alpha_{l,f} = \frac{\lambda}{\pi} \frac{1}{W_{l,f}}$$

with
$\alpha_{e,f}$: the emission angle of the laser (e) and acceptance angle of the fiber (f) respectively
λ: wavelength.

It is known in the art that the emission angle of a monomode laser is defined by the area of the light emitting spot and that the acceptance angle of a monomode fiber is defined by the core area. The hemispherical part 7 of the optical coupling system 3 can easily be obtained by melting one end of the glass rod. The optical coupling system thus consists of a cylindrical part 6 of length y and of a hemispherical part 7 of length r. This optical coupling system is attached to the end of the waveguide 2. The distance x must be adjusted with any known means.

For the easy manufacture of an optical coupling system 3 as described hereinbefore, there is used a length of stripped PCS waveguide (PCS=plastic cladded silica), having a diameter of 125 μm.

Subsequently to the stripping, the PCS waveguide merely consists of a homogeneous glass rod. Since the cladding 5 of the monomode waveguide 2 used has a diameter of 125 μm the stripped PCS waveguide fits on to the end of the waveguide 2. The core diameter of the waveguide 2 is 2 μm. The glass rod is melted onto the end of the waveguide 2. The melting should be carried out at such a high degree of precision as is known from the frequently performed melted splicings of waveguides. Next, the glass rod is cut off at the distance y+⅔r from its point of connection with the waveguide 2, with this distance amounting to approximately 1 mm, and the surface is rounded by way of heating into the shape of a hemisphere, in order thus to obtain the hemispherical part 7. This can be done with a conventional optical fiber splicing equipment by arc flame polishing. FIG. 2 shows an optical system 3 connected to the waveguide 2 manufactured as described above.

The length of 1 mm corresponds to the calculated value of the length y relating to the employed monomode waveguide and to the employed semiconductor laser. This length depends on the radius of curvature of the lens, but in the case of a defined heat treatment, this radius of curvature can be reproduced easily and rather exactly. Just as easy and exactly it is also possible to reproduce the length y once it has been calculated in dependence upon the radius of curvature, so that with the aid of the invention, it is possible to provide for each occurring case an optical coupling system of high coupling efficiency which is easy to manufacture.

The optical coupling system as described hereinbefore for coupling a laser to a monomode waveguide, when employed analogously, may also be used for coupling the ends of two fiber-optical waveguides or for the coupling-out on the receiver side.

In the first-mentioned case, the two ends to be coupled each are provided with such an optical coupling system. In this case, the two optical axes should be in line, and the distance between the two cylindrical parts 6 of the two optical coupling systems 3 facing one another, amounting to twice the length x.

In the second case the light-sensitive part of the receiver is arranged on the optical axis at a distance x from the cylindrical part 6 of the optical coupling system.

I claim:

1. An optical coupler and a generally cylindrical fiber-optic waveguide having a substantially planar end face, said optical coupler comprising a homogenous silica rod having a generally cylindrical portion having a length y and a diameter substantially equal to the diameter of said generally cylindrical waveguide, said homogenous silica rod having a substantially planar end face at one end fused to the substantially planar end face of said fiber-optic waveguide, a hemispherical lens surface formed at the other end of said homogenous silica rod having an axial length between a range of r and $\frac{2}{3}$r, y+r being greater than the diameter of said fiber-optic waveguide.

2. An optical coupler and a waveguide as recited in claim 1 wherein said fiber-optic waveguide comprises monomode fiber having a relatively small core.

3. An optical coupler and a waveguide as recited in claim 1 wherein y is approximately equal to $$\frac{r}{n-1}\left(1 + n\frac{W_f}{W_e}\right)$$

where r is the radius of the hemispherical lens surface and waveguide, n is the index of refraction of the homogenous silica rod, $W_e$ is calculated from $$\tan \alpha_e = \frac{\lambda}{\pi} \frac{1}{W_e}$$

where $\alpha_e$ is the emission angle of a light source and $\lambda$ is the wavelength of the light emitted from that source and $W_f$ is calculated from $$\tan \alpha_f = \frac{\lambda}{\pi} \frac{1}{W_f}$$

where $\alpha_f$ is the acceptance angle of said waveguide.

4. An optical coupler and a waveguide as recited in claim 1 wherein said hemispherical lens surface is adjacent the light emitting surface of a light source and wherein the distance X between the end of the cylindrical portion adjacent the hemispherical lens surface and the light emitting surface is approximately equal to $$\frac{r}{n-1}\left(1 + \frac{W_e}{W_f}\right) + r$$

where r is the radius of the hemispherical lens surface and waveguide, n is the index of refraction of the homogenous silica rod, $W_e$ is calculated from $$\tan \alpha_e = \frac{\lambda}{\pi} \frac{1}{W_e}$$

where $\alpha_e$ is the emission angle of a light source and $\lambda$ is the wavelength of the light emitted from that source and $W_f$ is calculated from $$\tan \alpha_f = \frac{\lambda}{\pi} \frac{1}{W_f}$$

where $\alpha_f$ is the acceptance angle of said waveguide.

5. An optical coupler and a waveguide as recited in claim 1 wherein said hemispherical lens surface is adjacent the light sensitive surface of a receiver and wherein the distance X between the end of the cylindrical portion adjacent the hemispherical lens surface and the light sensitive surface is approximately equal to $$\frac{r}{n-1}\left(1 + \frac{W_e}{W_f}\right) + r$$

where r is the radius of the hemispherical lens surface and waveguide, n is the index of refraction of the homogenous silica rod, $W_e$ is calculated from $$\tan \alpha_e = \frac{\lambda}{\pi} \frac{1}{W_e}$$

where $\alpha_e$ is the emission angle of a light source and $\lambda$ is the wavelength of the light emitted from that source and $W_f$ is calculated from $$\tan \alpha_f = \frac{\lambda}{\pi} \frac{1}{W_f}$$

where $\alpha_f$ is the acceptance angle of said waveguide.

6. An optical coupler and a waveguide as recited in claim 1 in combination with another optical coupler and another generally cylindrical fiber-optic waveguide having a substantially planar end face, said another optical coupler comprising another homogenous silica rod having a generally cylindrical portion with a length y and a diameter substantially equal to the diameter of said another generally cylindrical waveguide, said another homogenous silica rod having a substantially planar end face at one end fused to the substantially planar end face of said another waveguide, said another homogenous silica rod having a hemispherical lens surface formed at its other end which surface has an axial length r, y+r being greater than the diameter of said another fiber-optic waveguide, said hemispherical lens surfaces being aligned adjacent each other and the distance X separating the ends of the cylindrical portions adjacent the hemispherical lens surfaces being approximately equal to $$2\frac{r}{n-1}\left(1+\frac{W_e}{W_f}\right)+r$$

where r is the radius of the hemispherical lens surface and waveguide, n is the index of refraction of the homogenous silica rod, $W_e$ is calculated from $$\tan \alpha_e = \frac{\lambda}{\pi}\frac{1}{W_e}$$

where $\alpha_e$ is the emisson angle of a light source and $\lambda$ is the wavelength of the light emitted from that source and $W_f$ is calculated from $$\tan \alpha_f = \frac{\lambda}{\pi}\frac{1}{W_f}$$

where $\alpha_f$ is the acceptance angle of said waveguide.

* * * * *